United States Patent Office 3,244,700
Patented Apr. 5, 1966

3,244,700
1 - [p - (DIALKYLAMINOALKOXY)PHENYL] - 1-(PYRIDYL AND THIENYL)-2-ARYL(ETHYLENES AND ETHANES)
Frank P. Palopoli and Harvey D. Benson, Cincinnati, Ohio, Robert E. Allen, Walnut Creek, Calif., and Edward L. Schumann, Kalamazoo, Mich., assignors to Richardson-Merrell Inc., New York, N.Y., a corporation of Delaware
No Drawing. Filed Oct. 17, 1961, Ser. No. 145,760
11 Claims. (Cl. 260—240)

This application is a continuation-in-part of application S.N. 843,630, filed October 1, 1959, now abandoned.

This invention relates to new chemical compounds which have useful physiological and other valuable properties.

The new compounds of the present invention are heterocyclic derivatives of diarylethanes and diarylethylenes. They may be represented by the following formulae:

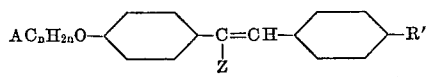

and

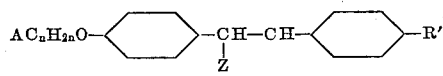

A is dialkylamino group in which the alkyl groups have from 1 to 4 carbon atoms or a heterocyclic group such as morpholino and piperidino, $n$ is an integer from 2 to 4 inclusive, R' is hydrogen, lower alkyl, halogen or lower alkoxy, and Z is an aromatic heterocyclic group such as pyridyl or thienyl. Acid addition salts, quaternary ammonium salts and the N-oxides of these compounds may also be prepared by known methods and are included within the scope of the present invention.

The ethylene derivatives of the present invention may be prepared by dehydration of the corresponding ethanols. Preparation of the ethanols is described in our co-pending application Serial No. 843,630 of which this is a continuation-in-part. As will be apparent from the disclosure of that application, the heterocyclic group represented by Z may be attached to the carbon atom bearing the hydroxy group or to the adjacent carbon atoms of the ethylenic moiety. To prepare the novel ethanols in which the heterocyclic group is on the alcoholic carbon atom, a suitably substituted benzyl magnesium halide is reacted with a heterocyclic phenyl ketone having the —$OC_nH_{2n}A$ group on the para position of the phenyl radical. To prepare ethanols in which the heterocyclic group is on the carbon atom adjacent to the hydroxyl bearing carbon atom, a suitably substituted lithium heterocyclic derivative is reacted with a benzophenone having a —$OC_nH_{2n}A$ group at the para position on one of the benzene rings as illustrated in the specific examples of Serial No. 843,630.

The novel ethylenes of the present invention are made by dehydrating one of the just described ethanols. The dehydration takes place very readily and in some instances will take place at room temperature in the presence of small amounts of an acid such as hydrochloric, sulfuric, hydrobromic, phosphoric, paratoluenesulfonic and the like.

The novel ethanes of the present invention may be prepared by hydrogenation of the corresponding ethylene derivatives as will be described in the specific examples.

The N-oxides of the ethanol and ethane derivatives are prepared by oxidation of these derivatives with hydrogen peroxide. The N-oxides of the ethylene derivatives are obtained by dehydration of the N-oxides of the ethanol derivatives.

The new compounds are basic and may be used as either the free bases or as acid addition salts or quaternary ammonium salts of these bases. These acid addition salts include the hydrochloride, hydrobromide, citrate, succinate, phosphate, sulfate, glycolate, acetate, malonate, maleate and other pharmaceutically suitable salts.

The compounds of the present invention are characterized by having valuable physiological properties, the most useful of which is their anti-inflammatory activity which makes them useful in reducing inflammation and edema as in the treatment of rheumatoid arthritis and other collagen diseases, gouty arthritis, neuralgia, bursitis, conjunctivitis and the like. Some of the new compounds have antifungal activity and are of value in the treatment of epidermal fungal infections. Some of the new compounds also have uterotrophic activity and are useful in functional uterine disorders. Some of the new compounds have an adrenal regulatory activity which makes them of value in controlling blood pressure. The principal specific physiological activity of these compounds is indicated in the specific examples which follow.

The new compounds may be administered orally in tablet or other suitable form parenterally, e.g. intravenously, or topically in an ointment. The dosage range will vary depending upon the mode of administration and intended use, varying from 25 milligrams to 2.5 grams daily when given orally, 0.1 milligram to 1.5 grams daily when given parenterally, and in concentrations of 1 to 10 percent when used in ointments.

EXAMPLE I

*1-[p-(β-diethylaminoethoxy)phenyl]-1-(2-pyridyl)-2-p-anisylethylene*

To a solution of 15 g. of 1-[p-(β-diethylaminoethoxy)phenyl]-1-(2 - pyridyl) - 2 - (p-methoxyphenyl)ethanol in 100 ml. of chloroform was added an excess of alcoholic hydrogen chloride. The resulting solution was heated under reflux for thirty minutes after which the solvent was removed under reduced pressure. The dehydrated product was recrystallized from a mixture of ethanol and ethyl acetate. The desired 1 - [p - (β-diethylaminoethoxy)-phenyl]-1-(2-pyridyl)-2-p-anisylethylene dihydrochloride was obtained as a crystalline solid melting with decomposition at 225° C.

This compound possesses anti-fungal activity.

EXAMPLE II

*1-[p-(β-diethylaminoethoxy)phenyl]-1-(2-thienyl)-2-phenylethylene*

When 1-[p-(β - diethylaminoethoxy)phenyl] - 1 - (2-thienyl) - 2 - phenylethanol was dehydrated by refluxing a solution having an excess of alcoholic hydrogen chloride as described in Example I, there was obtained an oil which resisted crystallization. The hydrochloride was neutralized with dilute alkali and the amine dissolved in ether. The desired product, 1 - [p - (β - diethylaminoethoxy)phenyl] - 1 - (2-thienyl) - 2 - phenylethylene, was obtained as an oil which formed a critric acid salt, melting with decomposition at 106° C.

This compound possesses adrenal regulatory activity.

EXAMPLE III

*1-[p-(β-diethylaminoethoxy)phenyl]-1-(2-thienyl)-2-(p-tolyl)ethylene*

When 1-[p-(β - diethylaminoethoxy)phenyl] - 1 - (2-thienyl) - 2 - (p-tolyl)ethanol replaced 1-[p-(β - diethylaminoethoxy)phenyl] - 1 - (2-thienyl)-2-phenylethanol and was refluxed as in Example I, 1-[p-(β - diethylaminoethoxy)phenyl] - 1 - (2-thienyl) - 2 - (p-tolyl)ethylene was obtained as an oil which formed a citric acid salt, melting with decomposition at 97° C.

This compound possesses anti-inflammatory activity.

EXAMPLE IV

*1-[p-(β-diethylaminoethoxy)phenyl]-1-(2-thienyl)2-p-anisylethylene*

A solution of 0.2 mole of p-methoxybenzylmagnesium chloride in ether was added to 55 g. of p-(β-diethylaminoethoxy)phenyl-2-thienyl ketone in ether. The magnesium salts were removed by filtration and dissolved in a saturated solution of ammonium chloride. The oil that separated was dissolved in ether from which the desired 1-[p-(β - diethylaminoethoxy)phenyl] - 1 - (2-thienyl)-2-p-anisylethylene was obtained as an oil which formed a citric acid salt, melting with decomposition at 118° C.

This compound possesses anti-fungal activity.

EXAMPLE V

*1-[p-(β-di-n-butylaminoethoxy)phenyl]-1-(2-thienyl)-2-(p-chlorophenyl)ethylene*

When 1-[p-(β - di - n - butylaminoethoxy)phenyl]-1-(2 - thienyl) - 2 - (p-chlorophenyl)ethanol is dehydrated as in Example I, 1-[p-(β-di-n-butaylaminoethoxy)phenyl]-1-(2-thienyl) - 2 - (p-chlorophenyl)ethylene is obtained as an oil which forms an oxalic acid salt, melting with decomposition at 82°–84° C.

This compound possesses uterotrophic and anti-inflammatory activity.

EXAMPLE VI

*1-[p-(β-4-morpholinylethoxy)phenyl]-1-(2-thienyl)-2-(p-chlorophenyl)ethylene*

When 1-[p-(β - 4 - morpholinylethoxy)phenyl] - 1 - (2-thienyl)-2-(p-chlorophenyl)ethanol is dehydrated as in Example I, the compound 1-[p-(β-4-morpholinylethoxy)phenyl] - 1 - (2-thienyl) - 2 - (p-chlorophenyl)ethylene hydrochloride salt was obtained, melting at 203° C.

This compound possesses anti-fungal activity.

EXAMPLE VII

*1-[p-(β-diethylaminoethoxy)phenyl]-1-(2-thienyl)-2-phenylethane*

Twelve grams of 1-[p-(β-diethylaminoethoxy)phenyl]-1-(2-thienyl) - 2 - phenylethylene was dissolved in 150 ml. of n-butyl alcohol and heated to boiling. Ten grams of sodium metal in small pieces was added over three hours. The reaction mixture was then poured into water and extracted with ether. The ether was dried, filtered through Dicalite and the solvent removed. 1-[p-(β-diethylaminoethoxy)phenyl] - 1 - (2-thienyl) - 2 - phenylethane was obtained as an oil which formed a citric acid salt, melting with decomposition at 117° C.

This compound possesses anti-inflammatory activity.

EXAMPLE VIII

*1-[p-(β-diethylaminoethoxy)phenyl]-1-(2-thienyl)-2-p-anisylethane*

Nine grams of 1-[p-(β - diethylaminoethoxy)phenyl]-1-(2-thienyl) - 2 - p - anisylethylene was dissolved in 125 ml. of iso-amyl alcohol and heated to boiling. Six grams of sodium metal in small pieces was added over two hours. The reaction mixture was then poured into water and extracted with ether. The ether was dried, filtered and the solvent removed. 1 - [p - (β - diethylaminoethoxy)phenyl] - 1 - (2-thienyl) - 2 - p - anisylethane was obtained as an oil which formed a citric acid salt, melting with decomposition at 99° C.

This compound possesses anti-inflammatory activity.

EXAMPLE IX

*1-[p-(β-diethylaminoethoxy)phenyl]-1-(2-thienyl)-2-(p-tolyl)ethane*

Eighteen grams of 1-[p-(β-diethylaminoethoxy)phenyl]-1-(2-thienyl)-2-(p-tolyl)ethanol was dissolved in 200 ml. of n-butyl alcohol and heated to boiling. Twelve grams of sodium metal in small pieces was added over three hours. The reaction mixture was then poured into water and extracted with ether. The ether layer was dried, filtered and the solvent removed. 1-[p-(β-diethylaminoethoxy)phenyl]-1-(2-thienyl)-2-(p-tolyl)ethane was obtained as an oil which formed a citric acid salt melting with decomposition at 111° C.

This compound possesses anti-inflammatory activity.

We claim:
1. 1-[p-(β-diethylaminoethoxy)phenyl]-1-(2-pyridyl)-2-p-anisylethene.
2. 1-[p-(β-diethylaminoethoxy)phenyl]-1-(2-thienyl)-2-phenylethene.
3. 1-[p-(β-diethylaminoethoxy)phenyl]-1-(2-thienyl)-2-(p-tolyl)ethene.
4. 1-[p-(β-diethylaminoethoxy)phenyl]-1-(2-thienyl)-2-p-anisylethene.
5. 1-[p - (β - di - n - butylaminoethoxy)phenyl] - 1 - (2-thienyl)-2-(p-chlorophenyl)ethene.
6. 1-[p-(β-4-morpholinylethoxy)phenyl]-1-(2-thienyl)-2-(p-chlorophenyl)ethene.
7. 1-[p-(β-diethylaminoethoxy)phenyl]-1-(2-thienyl)-2-phenylethane.
8. 1-[p-(β-diethylaminoethoxy)phenyl]-1-(2-thienyl)-2-p-anisylethane.
9. 1-[p-(β-diethylaminoethoxy)phenyl]-1-(2-thienyl)-2-(p-tolyl)ethane.
10. A compound of the formula:

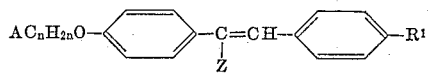

wherein A is a member selected from the group consisting of diloweralkylamino having from 1 to 4 carbon atoms in each alkyl group, morpholino and piperidino; $n$ is an integer from 2 to 4; $R^1$ is a member selected from the group consisting of hydrogen, methyl, halogen, and methoxy; and Z is thienyl.

11. A compound of the formula:

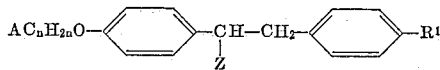

wherein A is a member selected from the group consisting of diloweralkylamino having from 1 to 4 carbon atoms in each alkyl group, morpholino and piperidino; $n$ is an integer from 2 to 4; $R^1$ is a member selected from the group consisting of hydrogen, methyl, halogen and methoxy; and Z is a member selected from the group consisting of pyridyl and thienyl.

References Cited by the Examiner

UNITED STATES PATENTS

| | | | |
|---|---|---|---|
| 2,703,324 | 3/1955 | Binkley et al. | 260—296 |
| 2,914,529 | 11/1959 | Allen et al. | 260—294.7 |
| 2,914,561 | 11/1959 | Allen et al. | 260—294.7 |
| 2,914,562 | 11/1959 | Allen et al. | 260—501 |
| 2,914,563 | 11/1959 | Allen et al. | 260—294.7 |
| 2,914,564 | 11/1959 | Allen et al. | 260—501 |
| 3,007,935 | 11/1961 | Bencze | 260—296 |
| 3,075,971 | 1/1963 | Bencze | 260—240 |
| 3,086,021 | 4/1963 | Biel | 260—296 X |

FOREIGN PATENTS 797,740  7/1958  Great Britain.

OTHER REFERENCES

Bernthsen: Organic Chemistry (1931 edition), pages 547, 548, 552, 567 and 568: D. Van Nostrand Company, Inc., New York, N.Y.

NICHOLAS S. RIZZO, *Primary Examiner.*

IRVING MARCUS, *Examiner.*